(12) United States Patent
Yoon

(10) Patent No.: US 9,988,051 B2
(45) Date of Patent: Jun. 5, 2018

(54) SYSTEM AND METHOD OF CONTROLLING VEHICLE DRIVING

(71) Applicant: Hyundai Motor Company, Seoul (KR)

(72) Inventor: Young Min Yoon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 259 days.

(21) Appl. No.: 14/938,002

(22) Filed: Nov. 11, 2015

(65) Prior Publication Data
US 2017/0072961 A1 Mar. 16, 2017

(30) Foreign Application Priority Data
Sep. 16, 2015 (KR) .................. 10-2015-0131181

(51) Int. Cl.
B60W 30/18 (2012.01)
B60W 10/06 (2006.01)
B60W 10/02 (2006.01)
B60W 50/00 (2006.01)
B60W 50/06 (2006.01)

(52) U.S. Cl.
CPC ...... *B60W 30/18072* (2013.01); *B60W 10/02* (2013.01); *B60W 10/06* (2013.01); *B60W 50/0098* (2013.01); *B60W 50/06* (2013.01); B60W 2030/1809 (2013.01); B60W 2030/18081 (2013.01); B60W 2050/0096 (2013.01); B60W 2540/10 (2013.01); B60W 2710/0644 (2013.01); Y02T 10/76 (2013.01)

(58) Field of Classification Search
CPC .......... B60W 30/18072; B60W 10/02; B60W 2710/0655; B60W 2600/00; B60W 2030/1809; B60W 2710/021
See application file for complete search history.

(56) References Cited

U.S. PATENT DOCUMENTS

| 9,026,296 B1* | 5/2015 | Johri | B60W 20/10 701/22 |
| 9,322,380 B2* | 4/2016 | Doering | F02D 41/023 |
| 2015/0158491 A1* | 6/2015 | Suzuki | B60W 30/18072 701/67 |
| 2016/0090093 A1* | 3/2016 | Neumann | B60W 30/18072 701/48 |

FOREIGN PATENT DOCUMENTS

| JP | 2006-176098 A | 7/2006 |
| JP | 2008-081099 A | 4/2008 |
| JP | 2012-030709 A | 2/2012 |
| JP | 2012-047148 A | 3/2012 |
| JP | 2015-094377 A | 5/2015 |
| KR | 2014-0148336 A | 12/2014 |
| WO | 2013/021500 A1 | 2/2013 |

* cited by examiner

*Primary Examiner* — David J Hlavka
(74) *Attorney, Agent, or Firm* — Mintz Levin Cohn Ferris Glovsky and Popeo, P.C.; Peter F. Corless

(57) ABSTRACT

A system and method of controlling vehicle driving is provided to mitigate a delay in vehicle acceleration when a sailing mode is released. The method includes when a sailing mode is operated, disengaged a clutch and adjusting an engine speed to correspond to a rotational speed of the clutch. Additionally, the clutch is engaged based on whether the sailing mode is released.

8 Claims, 3 Drawing Sheets

SYSTEM AND METHOD OF CONTROLLING VEHICLE DRIVING

CROSS-REFERENCE TO RELATED APPLICATION

This application claims the priority benefit of Korean Patent Application No. 10-2015-0131181, filed on Sep. 16, 2015 in the Korean Intellectual Property Office, the disclosure of which is incorporated herein by reference.

BACKGROUND

1. Field of the Invention

The present invention relates to a system and method of controlling vehicle driving, and more particularly, to a system and method of controlling vehicle driving, which mitigates a delay in vehicle acceleration when a coasting mode is released.

2. Description of the Related Art

A coasting mode or sailing mode technique in vehicles has been actively developed to improve fuel efficiency by increasing the distance that a vehicle coasts and simultaneously reducing the frequency of reacceleration thereof for cruising, when, during the driving of the vehicle, an accelerator pedal is disengaged and the clutch of a transmission is disengaged (e.g., neutralized) to allow the vehicle to coast.

In particular, in typical coasting, the vehicle travels by overcoming the friction of an engine, resulting from interruption of the supply of fuel to the engine, in a driving mode in which the vehicle is propelled by the engine, such that fuel is not unnecessarily consumed. In this state, an engine brake phenomenon occurs, and thus the vehicle rapidly decelerates. However, when the vehicle is decelerated by the engine brake through coasting when the vehicle is accelerated while consuming fuel, fuel efficiency deteriorates. Accordingly, for the vehicle to be maintained at a constant high speed for a substantial period of time, a cruising distance is required to be increased by disengaging the clutch of the transmission to prevent the engine brake from operating. This driving control technique is referred to as a "sailing mode" or "coasting mode" technique.

The use of such a sailing mode is typically restricted to situations where fuel-efficient driving is required. When the sailing mode is operated and released (i.e. when the clutch is disengaged and engaged), the driver's dissatisfaction is increased due to an impact, a delay in acceleration, a sense of difference, or the like according to the engagement and disengagement of the clutch. In addition, when the sailing mode is frequently operated and released in the normal driving mode, problems related to the operability of the vehicle may occur. Therefore, the use of the sailing mode must be limited.

The foregoing is intended merely to aid in the understanding of the background of the present invention, and is not intended to mean that the present invention falls within the purview of the related art that is already known to those skilled in the art.

SUMMARY

Therefore, the present invention provides a method of controlling vehicle driving, which mitigates a delay in vehicle acceleration when a coasting (e.g., sailing) mode is released.

In accordance with the present invention, the above and other objects may be accomplished by the provision of a method of controlling vehicle driving, which may include performing follow-up control in which, when a sailing mode is operated, a clutch is disengaged and an engine speed is adjusted to follow a rotational speed of the clutch, and performing engagement control in which, after the performing follow-up control, whether the clutch is engaged may be adjusted based on whether the sailing mode is released.

In the follow-up control, a drive shaft clutch may be disengaged, and the engine speed may be adjusted to follow or correspond to (e.g., match) a clutch rotational speed at a current target shift stage. In addition, when the sailing mode is released, the clutch may be operated to be engaged while slipping. When the sailing mode is maintained, the engine speed may be adjusted to match a clutch rotational speed at a current target shift stage while the clutch is maintained in a released state.

In the above-described method, an operational signal of an accelerator pedal may be input to a controller, and whether the sailing mode is operated or released may be determined by the controller. The clutch may be engaged and disengaged by clutch actuators, the clutch actuators may be operated by the controller, and the engine speed may be adjusted by the controller.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present invention, examples of which are illustrated in the accompanying drawings. Wherever possible, the same reference numbers will be used throughout the drawings to refer to the same or like parts.

Figure 1:
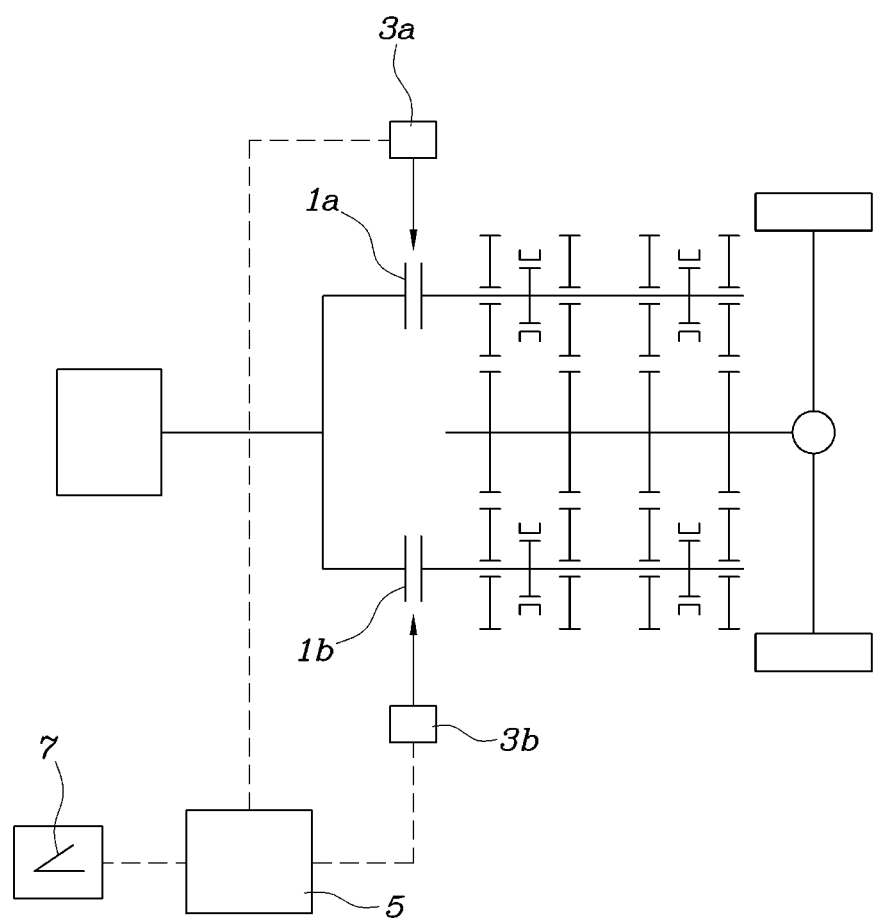
FIG. 1 is a diagram illustrating the overall layout of a vehicle system to which a dual clutch transmission (DCT) is mounted according to an exemplary embodiment of the present invention.

A method of controlling vehicle driving according to an exemplary embodiment of the present invention may include a follow-up control step and an engagement control step. The method of controlling vehicle driving of the present invention will be described in detail with reference to FIG. 1.

First, in the follow-up control step, when a sailing mode is operated, a clutch 1 may be disengaged, and an engine speed may be adjusted to correspond to (e.g., match) the rotational speed of the clutch. For example, in a DCT vehicle having two clutches 1a and 1b, the clutch that is disengaged and engaged may be a drive shaft clutch 1a. When the drive shaft clutch 1a is disengaged, the engine speed may be adjusted to correspond to a clutch rotational speed at a current target shift stage. In particular, reference numeral 1b may refer to a non-drive shaft clutch, and the drive shaft clutch and the non-drive shaft clutch are not fixed. The drive and non-drive shaft clutches may be exchanged based on the input shaft with which driving gears are engaged.

In other words, since the target shift stage may be changed based on the traveling speed of the vehicle, the engine speed may be adjusted to correspond to the rotational speed of the clutch 1 associated with a target shift gear. In particular, whether the sailing mode is operated may be determined by a controller 5. Accordingly, the operational signal of an accelerator pedal 7 (e.g., an accelerator position sensor (APS) signal) may be input to the controller 5. For example, in a fuel-efficient driving mode, when a tip-out signal of the accelerator pedal 7 is input to the controller while the vehicle travels above a predetermined speed, resulting from a tip-in operation for depressing (e.g., applying pressure to) the accelerator pedal 7, the controller may be configured to determine to operate the sailing mode. In addition, the clutches 1a and 1b may be engaged and disengaged by an odd-stage clutch actuator 3a and an even-stage clutch actuator 3b. The operations of the respective clutch actuators 3a and 3b may be operated by the controller 5. The engine speed may be adjusted by the controller 5.

Furthermore, in the engagement control step, whether the clutch is engaged may be determined based on whether the sailing mode is released, after the follow-up control step. For example, when the sailing mode is released in the engagement control step, the clutch may be operated to be engaged while slipping. In other words, after the sailing mode is operated, when a tip-in signal, indicating an engagement of the accelerator pedal 7 (e.g., a depressing thereof or pressure being exerted onto the pedal), is input to the controller 5, the controller 5 may be configured to determine to release the sailing mode. In particular, the clutch may be engaged while slipping, and thus a tip-in shock due to the engagement of the clutch may be prevented.

Figure 3:
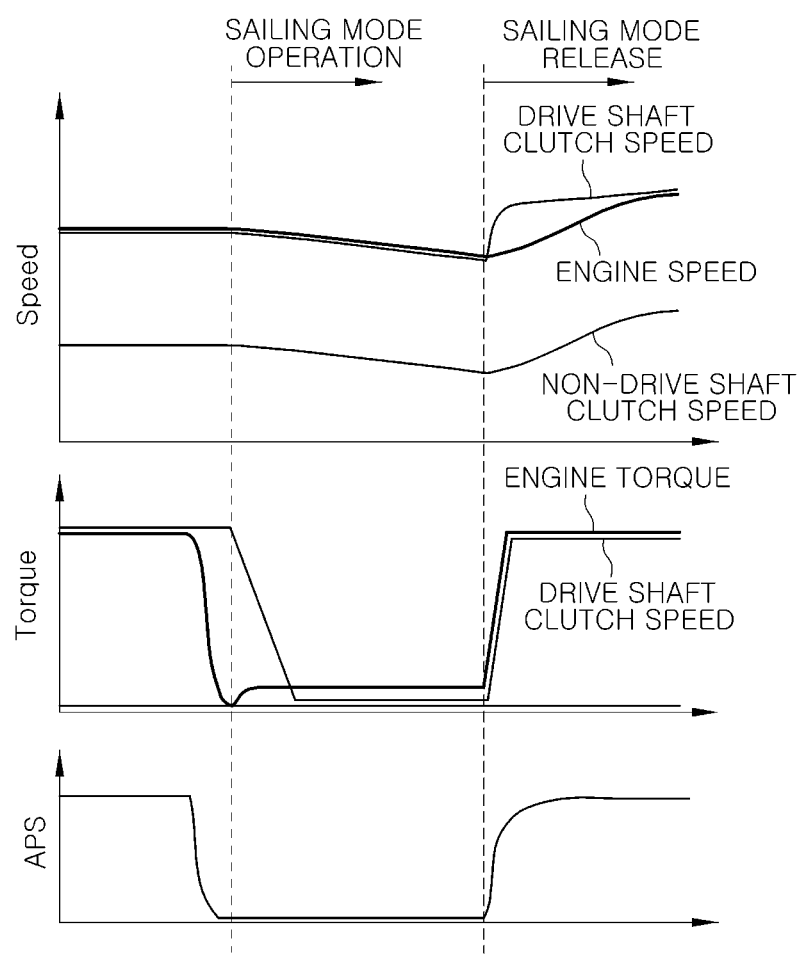
FIG. 3 is a diagram for explaining variations in speed and torque of an engine and a clutch when a sailing mode is operated and released, in the method of controlling vehicle driving according to the exemplary embodiment of the present invention.

Meanwhile, when the sailing mode is maintained in the engagement control step, the engine speed may be adjusted to correspond to the clutch rotational speed at the current target shift stage while the clutch 1b is maintained in a disengaged state. In other words, when the sailing mode is operated, the engine speed may be adjusted to correspond to the rotational speed of the drive shaft clutch 1a, the engine speed may be greater than than an engine idle speed with the consequence that fuel consumption increases, as illustrated in FIG. 3. However, when the sailing mode is released, the tip-in response of the accelerator pedal 7 may be improved. As a result, the operation range of the sailing mode may be expanded, and thus the overall fuel efficiency of the vehicle may be improved.

Figure 2:
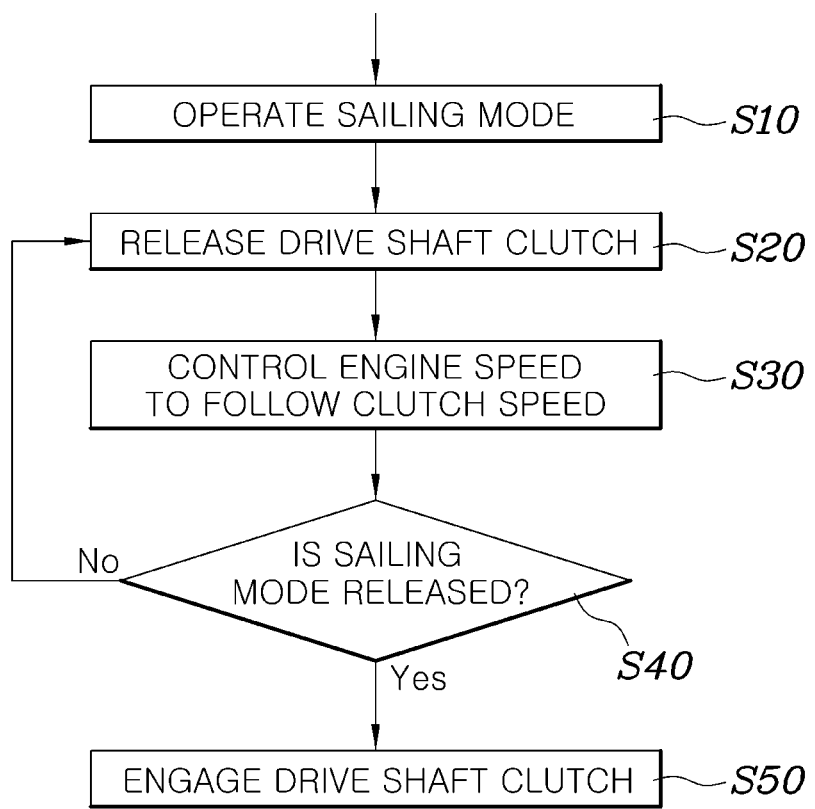
FIG. 2 is a flowchart illustrating a method of controlling vehicle driving according to the exemplary embodiment of the present invention.

The control flow of vehicle driving will be described with reference to FIG. 2. The control flow described herein below may be executed by the controller 5 having a processor and a memory. First, the controller may be configured to determine whether the sailing mode is operated while the vehicle coasts. When the sailing mode is operated (S10), the drive shaft clutch 1a may be disengaged (S20), and then the engine speed may be adjusted to correspond to the rotational speed of the clutch associated with a target shift gear (S30). Further, whether the sailing mode is released may be determined by detecting the tip-in operational signal of the accelerator pedal 7 (S40).

When the sailing mode is not released, the process may return to step S30 again, to adjust the engine speed to correspond to the rotational speed of the clutch associated with a target shift gear while the drive shaft clutch is maintained in a disengaged state. Additionally, when the sailing mode is determined to be released, the clutch associated with a target shift gear may be engaged and the vehicle may be driven (S50). In particular, when the target shift gear is provided to an input shaft in which the drive shaft clutch is arranged, the engine speed may be adjusted to correspond to and synchronize with the rotational speed of the drive shaft clutch 1a. However, when the target shift gear is provided to an input shaft in which the non-drive shaft clutch is arranged, the engine speed may be adjusted to correspond to and synchronize with the rotational speed of the non-drive shaft clutch 1b.

As described above, the present invention may adjust the engine speed to synchronize the engine speed with the rotational speed of the drive shaft clutch when the sailing mode is operated, thereby improving response to the tip-in operation of the accelerator pedal 7 when the sailing mode is released, and thus improving acceleration performance.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling vehicle driving, comprising:
performing, by a controller, a follow-up control in which, when a sailing mode is operated, a clutch is disengaged and an engine speed is adjusted to correspond to a rotational speed of the clutch; and
performing, by the controller, an engagement control in which whether the clutch is engaged is executed based on whether the sailing mode is released,
wherein, in the performing engagement control, when the sailing mode is released, the clutch is operated to be engaged while slipping.

2. The method according to claim 1, wherein, in the performing follow-up control, a drive shaft clutch is disengaged, and the engine speed is adjusted to correspond to a clutch rotational speed at a current target shift stage.

3. The method according to claim 1, wherein, in the performing engagement control, when the sailing mode is maintained, the engine speed is adjusted to correspond to a clutch rotational speed at a current target shift stage while the clutch is maintained in a released state.

4. The method according to claim 1, further comprising:
receiving, by the controller, an operational signal of an accelerator pedal;
determining, by the controller, whether the sailing mode is operated or released; and
engaging or disengaging, by the controller, the clutch using clutch actuators.

5. A system of controlling vehicle driving, comprising:
a memory configured to store program instructions; and
a processor configured to execute the program instructions, the program instructions when executed configured to:
disengage a clutch when a sailing mode is operated and adjust an engine speed to correspond to a rotational speed of the clutch; and
engage the clutch based on whether the sailing mode is released,
wherein the program instructions when executed are further configured to engage the clutch when the sailing mode is released while slipping.

6. The system according to claim 5, wherein the program instructions when executed are further configured to:
disengage a drive shaft clutch and adjust the engine speed to correspond to a clutch rotational speed at a current target shift stage.

7. The according to claim 5, wherein the program instructions when executed are further configured to:
when the sailing mode is maintained, adjust the engine speed to correspond to a clutch rotational speed at a current target shift stage while the clutch is maintained in a released state.

8. The according to claim 5, wherein the program instructions when executed are further configured to:
receive an operational signal of an accelerator pedal;
determine whether the sailing mode is operated or released; and
engage or disengage the clutch using clutch actuators.

* * * * *